United States Patent
Chen et al.

(10) Patent No.: US 11,848,034 B2
(45) Date of Patent: Dec. 19, 2023

(54) ANTI-PARALLEL COUPLED WRITER SHIELDS WITH STABLE MAGNETIC DOMAIN CONFIGURATION

(71) Applicant: Western Digital Technologies, Inc., San Jose, CA (US)

(72) Inventors: Yingjian Chen, Fremont, CA (US); Yonghua Chen, San Jose, CA (US); Anna Zheng, San Jose, CA (US); Zhanjie Li, Pleasanton, CA (US); Yi Wang, Mountain View, CA (US); Jian Xiang Shen, Pleasanton, CA (US); Lijie Guan, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/541,794

(22) Filed: Dec. 3, 2021

(65) Prior Publication Data
US 2023/0178104 A1 Jun. 8, 2023

(51) Int. Cl.
*G11B 5/31* (2006.01)
*G11B 5/127* (2006.01)
*G11B 5/39* (2006.01)

(52) U.S. Cl.
CPC .......... *G11B 5/3113* (2013.01); *G11B 5/1278* (2013.01); *G11B 5/315* (2013.01); *G11B 5/3146* (2013.01); *G11B 5/3912* (2013.01)

(58) Field of Classification Search
None
See application file for complete search history.

(56) References Cited

U.S. PATENT DOCUMENTS

| | | | |
|---|---|---|---|
| 4,849,841 A | 7/1989 | Sokolik | |
| 6,292,334 B1 * | 9/2001 | Koike et al. | G11B 5/3903 360/319 |
| 6,437,949 B1 * | 8/2002 | Macken et al. | G11B 5/3113 360/319 |

(Continued)

OTHER PUBLICATIONS

Lim et al., "Effect of Soft Underlayer Magnetic Anisotroy om Perpendicular Recording Process", Journal of Magnetism and Magnetic Materials, vol. 310, Issue 2, Part 3, Mar. 2007, Abstract Only.

*Primary Examiner* — Craig A. Renner
(74) *Attorney, Agent, or Firm* — PATTERSON + SHERIDAN, LLP; Steven H. VerSteeg

(57) ABSTRACT

The present disclosure generally relates to magnetic recording devices with stable magnetization. The magnetic recording device comprises a lower leading shield, an upper leading shield disposed on the lower leading shield, a main pole disposed above the upper leading shield, a trailing shield disposed above the main pole and upper leading shield, and an upper return pole disposed above the trailing shield. A first non-magnetic layer is disposed between the lower leading shield and the upper leading shield, and a second non-magnetic layer is disposed between the trailing shield and the upper return pole. The lower leading shield has a different domain state than the upper leading shield, and the trailing shield and the upper leading shield have a same domain state. The materials and thickness of the first and second non-magnetic layers result in magnetostatic coupling or anti-ferromagnetic coupling.

21 Claims, 14 Drawing Sheets

(56) References Cited

U.S. PATENT DOCUMENTS

| | | |
|---|---|---|
| 6,807,031 B2 * | 10/2004 | Macken et al. ....... G11B 5/3113 |
| | | 360/125.39 |
| 6,842,313 B1 | 1/2005 | Mallary |
| 7,106,554 B2 | 9/2006 | Guan et al. |
| 7,295,401 B2 * | 11/2007 | Jayasekara et al. . G11B 5/1278 |
| | | 360/125.08 |
| 7,394,620 B2 * | 7/2008 | Taguchi ............... G11B 5/1278 |
| | | 360/125.03 |
| 7,561,379 B2 * | 7/2009 | Li et al. ............... G11B 5/1278 |
| | | 360/125.24 |
| 8,848,316 B2 | 9/2014 | Kief et al. |
| 9,013,836 B1 * | 4/2015 | Liu et al. ............. G11B 5/1278 |
| | | 360/319 |
| 9,123,359 B1 * | 9/2015 | Han et al. ............ G11B 5/1278 |
| 9,142,227 B1 | 9/2015 | Etoh et al. |
| 9,805,745 B1 * | 10/2017 | Takagishi et al. ..... G11B 5/315 |
| 2003/0021050 A1 | 1/2003 | Lam |
| 2005/0068671 A1 | 3/2005 | Hsu et al. |
| 2017/0148473 A1 | 5/2017 | Wei et al. |
| 2023/0044051 A1 * | 2/2023 | Lam ....................... G11B 5/315 |

* cited by examiner

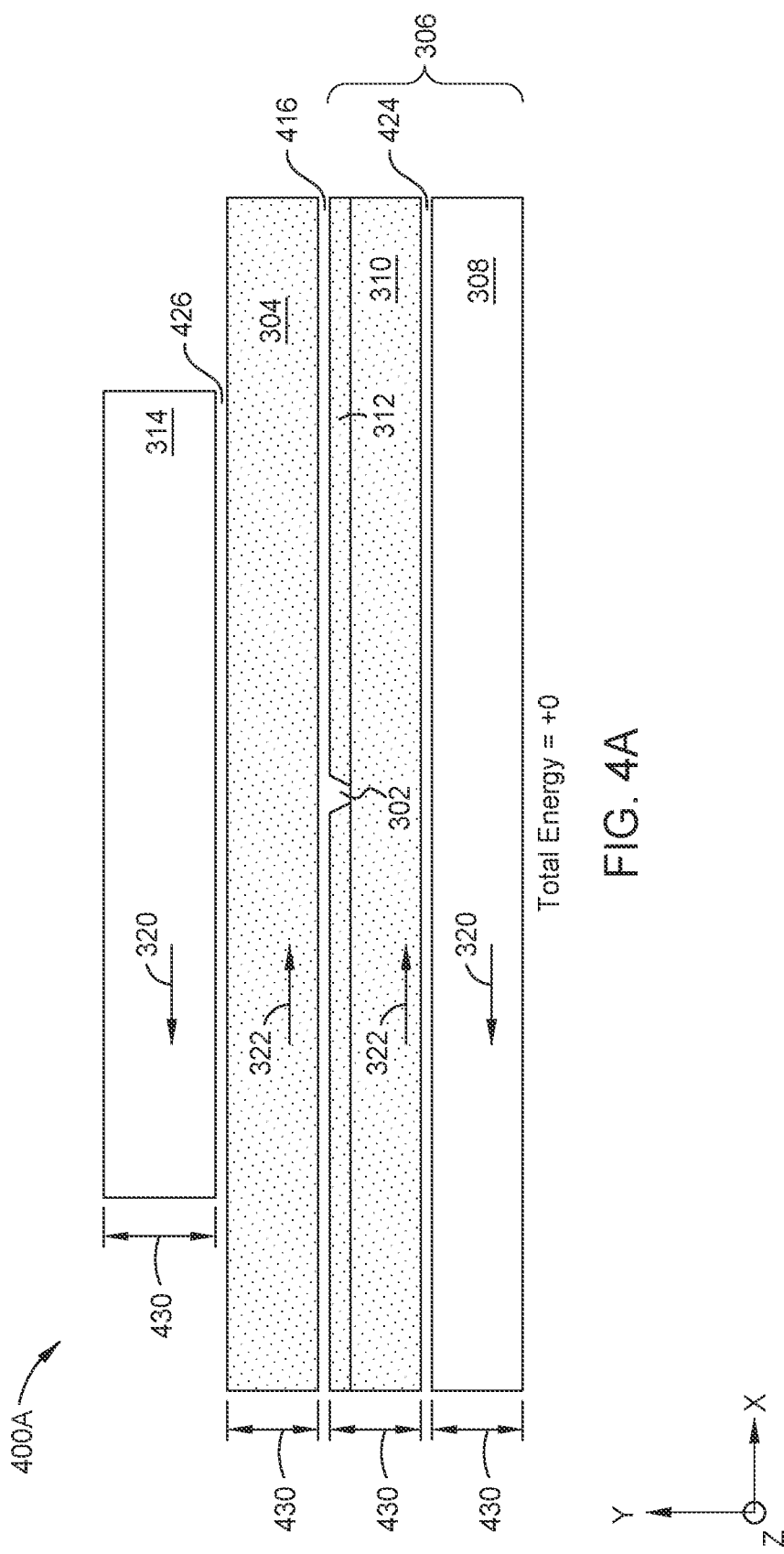

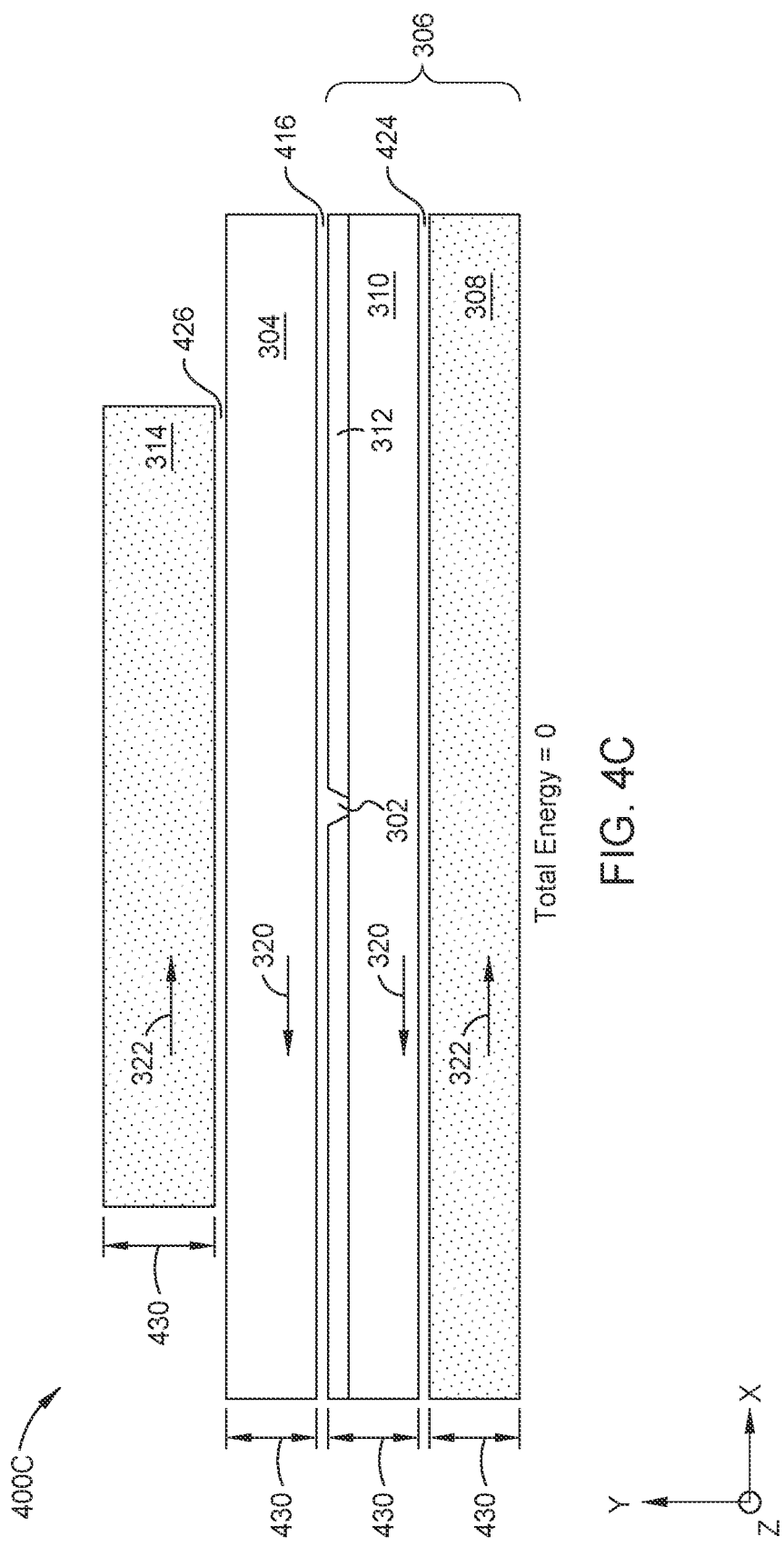

ANTI-PARALLEL COUPLED WRITER SHIELDS WITH STABLE MAGNETIC DOMAIN CONFIGURATION

BACKGROUND OF THE DISCLOSURE

Field of the Disclosure

Embodiments of the present disclosure relate generally to magnetic recording systems, and more particularly to a magnetic recording head with stable magnetization.

Description of the Related Art

Over the past few years, various magnetic recording methods have been studied to improve the areal density of a magnetic media device, such as a hard disk drive (HDD). Magnetic recording heads, or, in particular, the write heads, in HDDs can have a significant effect on the overall performance and reliability of the recording device. Magnetic recording heads may be designed to achieve specific advantages, such as improved performance, but may consequently have a negative impact on other characteristics, such as decreased reliability.

For example, some magnetic recording head designs use various shields around a main pole, such as side shields, leading shields, and trailing shields, to make the magnetic recording head sufficiently strong to write data to magnetic media, without disturbing the data that have already been previously written. The more recent energy assisted writers enable passing current between the main pole and the trailing shield, as well as the side-shield and leading shield assembly, to further enhance the writing ability. However, in energy assisted designs, magnetization stability is often compromised due to the modifications needed to accommodate the energy-assistance scheme, such as the insertion of a separation-gap between the trailing-shield/upper-return-pole assembly and side-shield/leading-shield assembly.

Therefore, there is a need in the art for a magnetic recording head having improved shields and stable magnetization.

SUMMARY OF THE DISCLOSURE

The present disclosure generally relates to magnetic recording devices with stable magnetization. The magnetic recording device comprises a lower leading shield, an upper leading shield disposed on the lower leading shield, a main pole disposed above the upper leading shield, a trailing shield disposed above the main pole and upper leading shield, and an upper return pole disposed above the trailing shield. A first non-magnetic layer is disposed between the lower leading shield and the upper leading shield, and a second non-magnetic layer is disposed between the trailing shield and the upper return pole. The lower leading shield has a different domain state than the upper leading shield, and the trailing shield and the upper leading shield have a same domain state. The materials and thickness of the first and second non-magnetic layers result in magnetostatic coupling or anti-ferromagnetic coupling.

In one embodiment, a magnetic recording head comprises a main pole, a trailing shield disposed above the main pole, an upper return pole disposed above the trailing shield, the upper return pole having a different domain state than the trailing shield, wherein the trailing shield and the upper return pole are anti-parallel coupled, a first non-magnetic layer disposed between the upper return pole and the trailing shield, an upper leading shield disposed below the main pole, a lower leading shield disposed below the upper leading shield, the lower leading shield having a different domain state than the upper leading shield, wherein the upper leading shield and the lower leading shield are anti-parallel coupled, and a second non-magnetic layer disposed between the upper leading shield and the lower leading shield.

In another embodiment, a magnetic recording head comprises a main pole, a trailing shield disposed on the main pole, the trailing shield having a first domain state, an upper return pole disposed on the trailing shield, the upper return pole having a second domain state, the first and second domain states being anti-parallel, a first non-magnetic layer disposed between and in contact with the upper return pole and the trailing shield, an upper leading shield disposed below the main pole, the upper leading shield having the first domain state, wherein the upper return pole and the trailing shield are magnetostatically coupled, a lower leading shield disposed below the upper leading shield, the lower leading shield having the second domain state, and a second non-magnetic layer disposed between and in contact with the upper leading shield and the lower leading shield, wherein the upper leading shield and the lower leading shield are anti-ferromagnetically coupled.

In yet another embodiment, a magnetic recording head comprises a main pole, a trailing shield disposed above the main pole, the trailing shield having a first domain state and a first thickness, an upper return pole disposed above the trailing shield, the upper return pole having a second domain state and a second thickness less than the first thickness, wherein the upper return pole and the trailing shield are anti-ferromagnetically coupled, a first non-magnetic layer disposed between the upper return pole and the trailing shield, the first non-magnetic layer comprising Ru, Cr, Rh, or Ir, an upper leading shield disposed below the main pole, the upper leading shield having the first domain state and the second thickness, wherein the upper leading shield comprises side shields disposed adjacent to the main pole, a lower leading shield disposed below the upper leading shield, the lower leading shield having the second domain state and the first thickness, and a second non-magnetic layer disposed between the upper leading shield and the lower leading shield, the second non-magnetic layer comprising NiCr, NiFeCr, Ti, Au, or Cu, wherein a total magnetostatic energy of the magnetic recording head is about 0, and wherein the upper leading shield and the lower leading shield are magnetostatically coupled.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4F illustrate MFS views of magnetic recording heads having stable domain states, according to various embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to magnetic recording devices with stable magnetization. The magnetic recording device comprises a lower leading shield, an upper leading shield disposed on the lower leading shield, a main pole disposed above the upper leading shield, a trailing shield disposed above the main pole and upper leading shield, and an upper return pole disposed above the trailing shield. A first non-magnetic layer is disposed between the lower leading shield and the upper leading shield, and a second non-magnetic layer is disposed between the trailing shield and the upper return pole. The lower leading shield has a different domain state than the upper leading shield, and the trailing shield and the upper leading shield have a same domain state. The materials and thickness of the first and second non-magnetic layers result in magnetostatic coupling or anti-ferromagnetic coupling.

Figure 1:
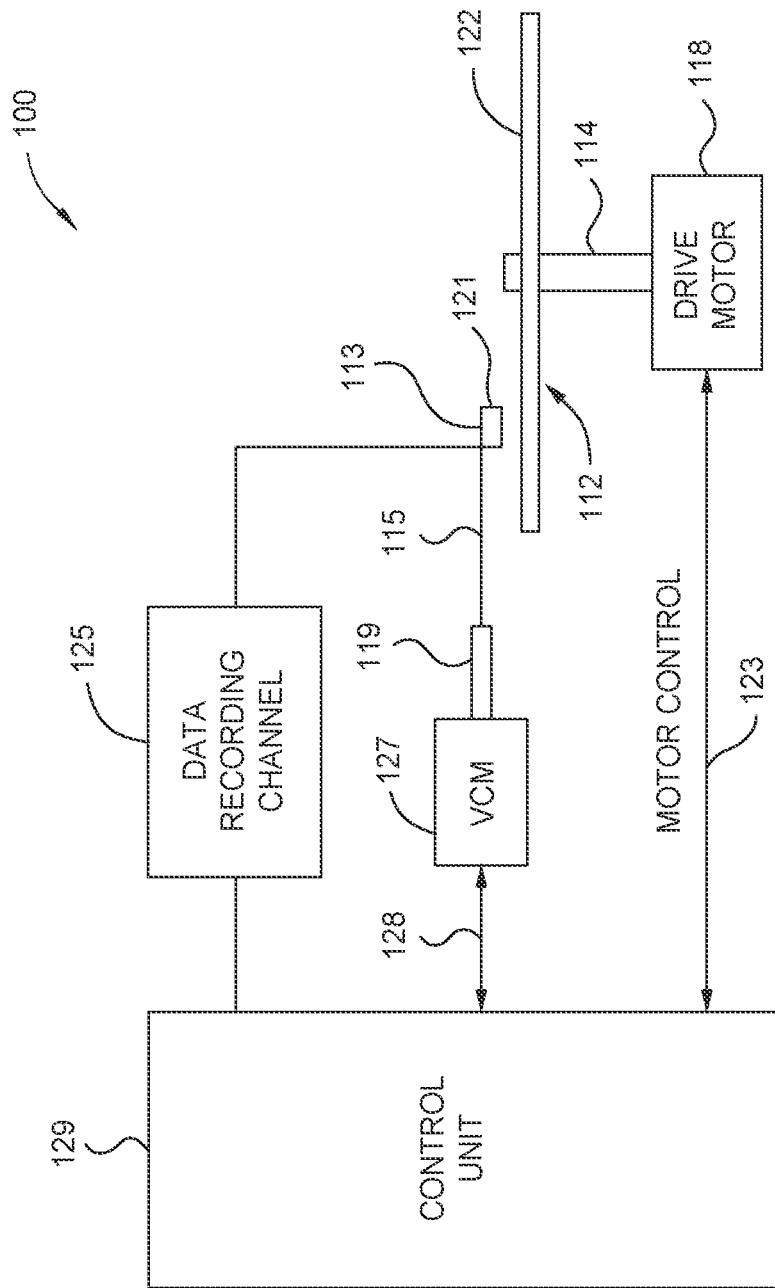
FIG. 1 illustrates a disk drive embodying this disclosure.

FIG. 1 illustrates a disk drive 100 embodying this disclosure. As shown, at least one rotatable magnetic media 112 is supported on a spindle 114 and rotated by a disk drive motor 118. The magnetic recording on each disk is in the form of any suitable patterns of data tracks, such as annular patterns of concentric data tracks (not shown) on the magnetic media 112.

At least one slider 113 is positioned near the magnetic media 112, each slider 113 supporting one or more magnetic head assemblies 121. As the magnetic media rotates, the slider 113 moves radially in and out over the media surface 122 so that the magnetic head assembly 121 may access different tracks of the magnetic media 112 where desired data are written. Each slider 113 is attached to an actuator arm 119 by way of a suspension 115. The suspension 115 provides a slight spring force which biases the slider 113 toward the media surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic media 112 generates an air bearing between the slider 113 and the media surface 122 which exerts an upward force or lift on the slider 113. The air bearing thus counterbalances the slight spring force of suspension 115 and supports slider 113 off and slightly above the media 112 surface by a small, substantially constant spacing during normal operation. In the case of EAMR, a DC magnetic field generated from an assist element of the magnetic head assembly 121 enhances the write-ability so that the write element of the magnetic head assembly 121 may efficiently magnetize the data bits in the media 112.

The various components of the disk drive 100 are controlled in operation by control signals generated by control unit 129, such as access control signals and internal clock signals. Typically, the control unit 129 comprises logic control circuits, storage means, and a microprocessor. The control unit 129 generates control signals to control various system operations, such as drive motor control signals on line 123 and head position and seek control signals on line 128. The control signals on line 128 provide the desired current profiles to optimally move and position slider 113 to the desired data track on media 112. Write and read signals are communicated to and from write and read heads on the assembly 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Figure 2:
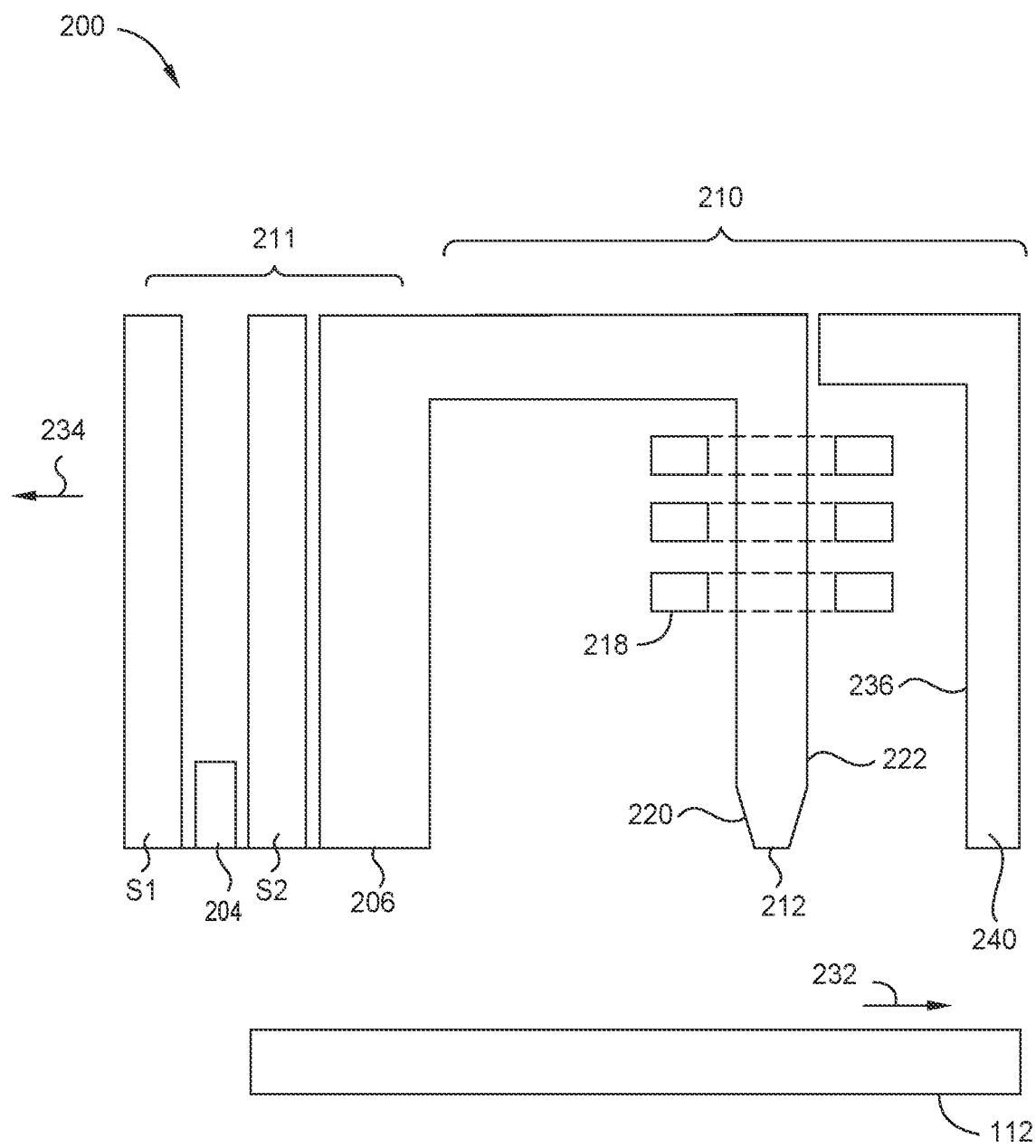
FIG. 2 is a fragmented, cross-sectional side view through the center of a read/write head facing a magnetic media, according to one embodiment.

FIG. 2 is a fragmented, cross sectional side view through the center of a read/write head 200 facing the magnetic media 112, according to one embodiment. The read/write head 200 may correspond to the magnetic head assembly 121 described in FIG. 1. The read/write head 200 includes a media facing surface (MFS) 212, such as an air bearing surface (ABS), a magnetic write head 210, and a magnetic read head 211, and is mounted such that the MFS 212 is facing the magnetic media 112. The read/write head 200 may be an energy-assisted magnetic recording (EAMR) head or a perpendicular magnetic recording (PMR) head. In FIG. 2, the magnetic media 112 moves past the write head 210 in the direction indicated by the arrow 232 and the read/write head 200 moves in the direction indicated by the arrow 234.

In some embodiments, the magnetic read head 211 is a SOT differential reader 204 located between the shields S1 and S2. In other embodiments, the magnetic read head 211 is a magnetoresistive (MR) read head that includes an MR sensing element 204 located between MR shields S1 and S2. In some other embodiments, the magnetic read head 211 is a magnetic tunnel junction (MTJ) read head that includes a MTJ sensing element 204 located between MR shields S1 and S2. The magnetic fields of the adjacent magnetized regions in the magnetic media 112 are detectable by the MR (or MTJ) sensing element 204 as the recorded bits.

The write head 210 includes a return pole 206, a main pole 220, a trailing shield 240, and a coil 218 that excites the main pole 220. The coil 218 may have a "pancake" structure which winds around a back-contact between the main pole 220 and the return pole 206, instead of a "helical" structure shown in FIG. 2. A trailing gap (not shown) and a leading gap (not shown) may be in contact with the main pole and a leading shield (not shown) may be in contact with the leading gap. A recording magnetic field is generated from the main pole 220 and the trailing shield 240 helps making the magnetic field gradient of the main pole 220 steep. The main pole 220 may be a magnetic material such as a FeCo alloy. The main pole 220 may include a trailing surface 222 which may be parallel to a leading surface 236 of the trailing shield 240. The main pole 220 may be a tapered write pole (TWP) with a trailing edge taper (TET) configuration. In one embodiment, the main pole 220 has a saturated magnetization (Ms) of 2.4 T and a thickness of about 300 nanometers (nm). The main pole 220 may comprise ferromagnetic materials, typically alloys of one or more of Co, Fe, and Ni. The trailing shield 240 may be a magnetic material such as NiFe alloy. In one embodiment, the trailing shield 240 has an Ms of about 1.2 T to about 1.6 T.

FIGS. 3A-3E illustrate media facing surface (MFS) views of magnetic recording heads 300A-300E having unstable domain states, according to various embodiments. Each of the magnetic recording heads 300A-300E comprises a main pole 302, side shields 312 disposed adjacent to the main pole (e.g., the x-direction), a leading shield 306 disposed below the main pole 302 and side shields 312 (e.g., the −y-direction), a trailing shield 304 disposed above the main pole 302 and side shields 312 (e.g., the y-direction), and an upper return pole 314 disposed above the trailing shield 304. The leading shield 306 comprises a lower leading shield 308 and an upper leading shield 310. In each of the magnetic recording heads 300A-300D, a non-magnetic layer 316 may optionally be disposed between the side shields 312 and the trailing shield 304.

Each of the magnetic recording heads 300A-300E has two anti-parallel domain states, a first magnetic domain state 322 in the x-direction, represented by the shading, (e.g., a positive domain state) and a second magnetic domain state 320 in the −x-direction, represented by without any shading, (e.g., a negative domain state). The domain states of the magnetic recording heads 300A-300E result from a combination of the materials used in the magnetic recording heads 300A-300E, the stress of the materials, various geometries of the magnetic recording heads 300A-300E, exchange coupling, and favorable energy states, for example. The lower leading shield 308, the upper leading shield 310, the trailing shield 304, and the upper return pole 314 each has about the same area at the MFS, and thus, is assigned a unit of "1" with respect to the magnetic domain states of each shield. For example, when a magnetic field is applied in entirety to each of the magnetic recording heads 300A-300E in the +x-direction, each of the magnetic recording heads 300A-300E is in the magnetostatic energy state of +4. Similarly, when a magnetic field is applied in entirety to each of the magnetic recording heads 300A-300E in the −x-direction, each of the magnetic recording heads 300A-300E is in the magnetostatic energy state of −4.

Initially, during the backend process prior to operation of the magnetic recording heads 300A-300E, a magnetic field is applied to each magnetic recording head 300A-300E to force the domain state to all be the same or in the same direction (e.g., the first domain state 322). Once the magnetic field is removed, the domain states of the magnetic recording heads 300A-300E relax to the most natural domain states or the lowest overall magnetic energy. It is undesirable to have the upper leading shield 310 and the trailing shield 304 to be in antiparallel magnetic state, as such an antiparallel magnetic state will induce performance loss and cross track interference.

As current is applied to the magnetic recording heads 300A-300E, the current flows through the upper return pole 314 and trailing shield 304 to the main pole 302. The applied current causes the overall domain state, or magnetostatic energy, of the magnetic recording heads 300A-300E to change. The domain states or magnetostatic energy of the magnetic recording heads 300A-300E may be unstable, causing instability in the various shields of the magnetic recording heads 300A-300E, such as the trailing shield 304, the side shields 312, and/or the leading shield 306.

Figure 3A:
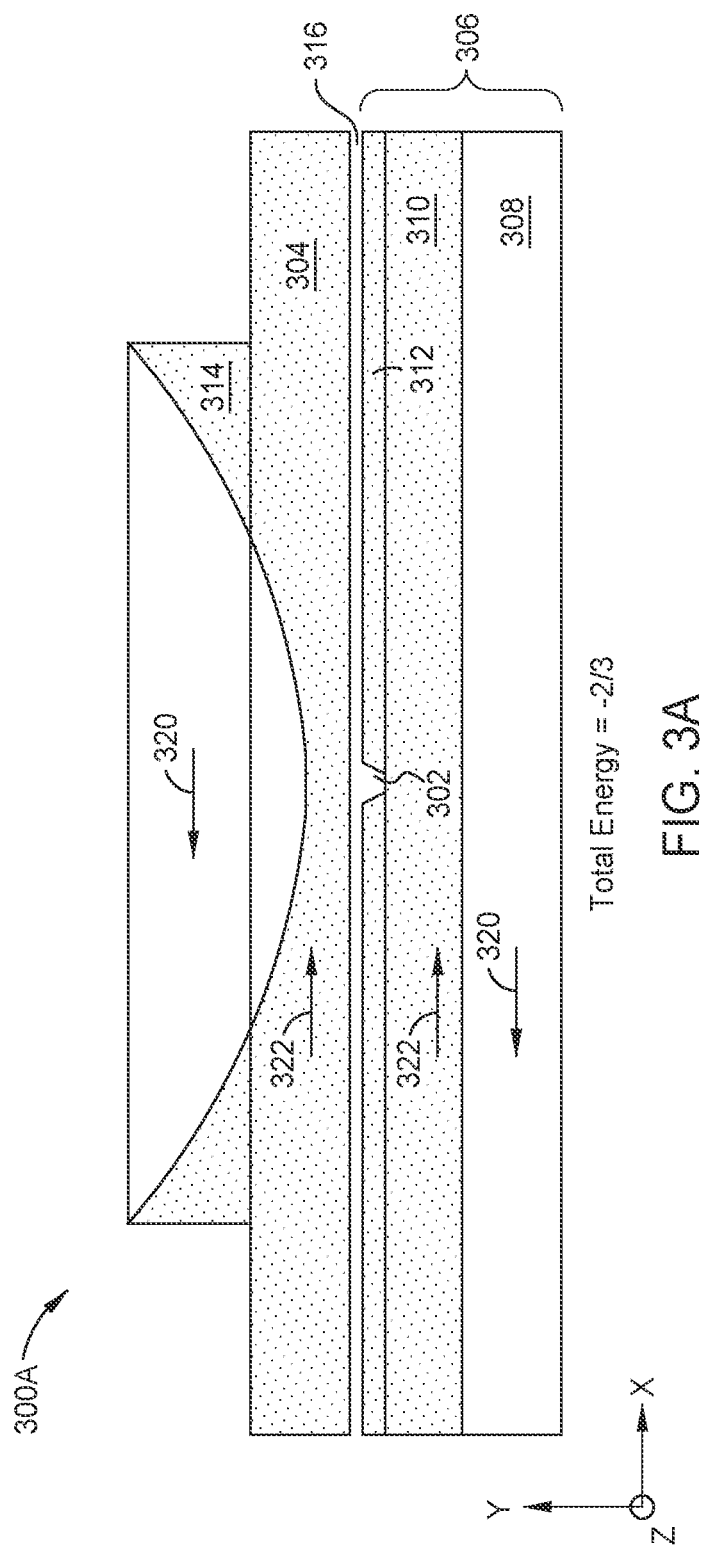
FIGS. 3A-3E illustrate media facing surface (MFS) views of magnetic recording heads having unstable domain states, according to various embodiments.

For example, in the magnetic recording head 300A of FIG. 3A, the lower leading shield 308, the upper return pole 314, and a portion of the trailing shield 304 have the second domain state 320 while the upper leading shield 310, the side shields 312, and a portion of the trailing shield 304 have the first domain state 322. As a result, the overall magnetostatic energy of the magnetic recording head 300A is −⅔, which is relatively unstable. With small disturbances, this metastable state of −⅔ could have domain wall movement which may change it into a more stable state but causes performance issues, such as loss of overwrite.

Figure 3B:
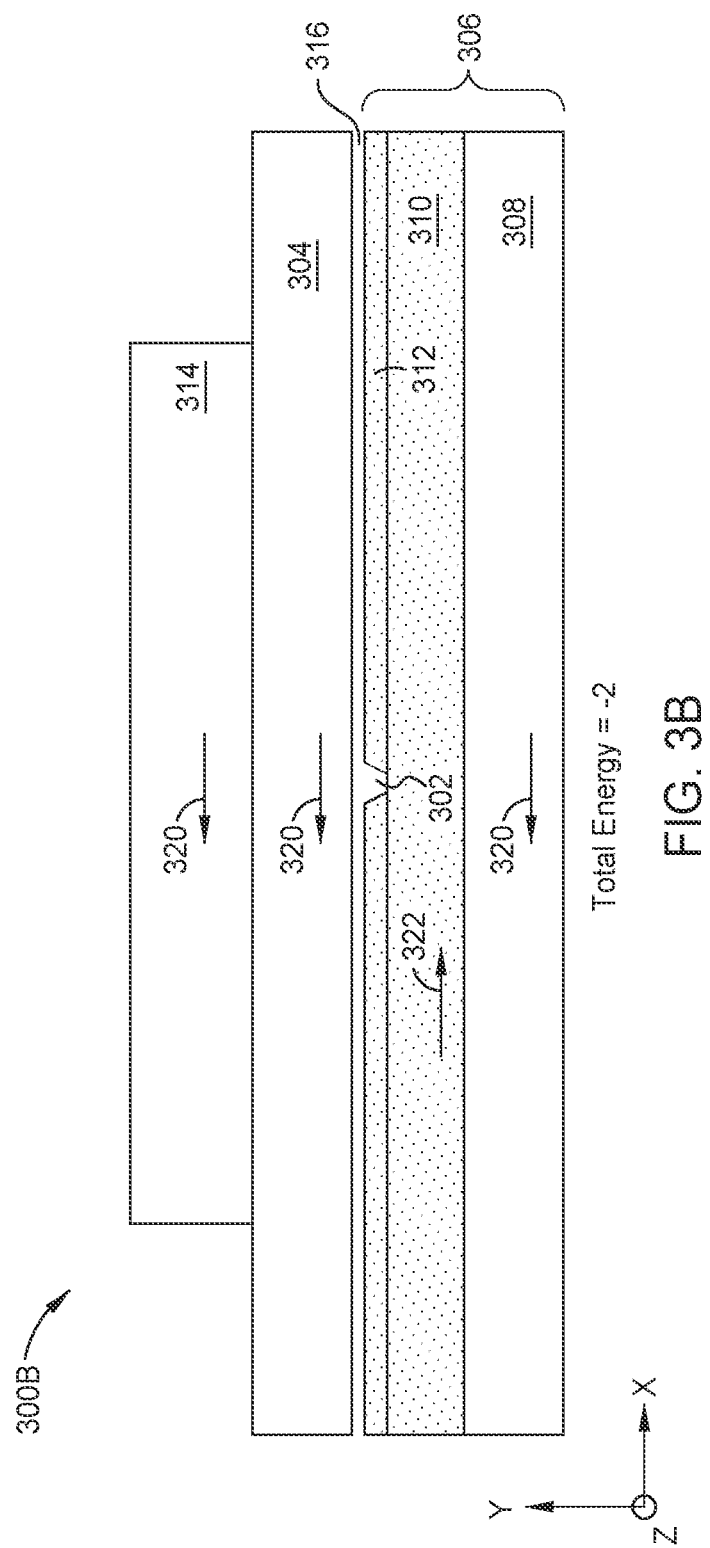

In the magnetic recording head 300B of FIG. 3B, the upper leading shield 310 and the side shields 312 have the first domain state 322 while the lower leading shield 308, the trailing shield 304, and the upper return pole 314 have the second domain state 320. As a result, the overall magnetostatic energy of the magnetic recording head 300B is −2, which is relatively unstable. With small disturbances, this metastable state of −2 could have domain wall movement which causes performance issues, such as loss of overwrite.

Figure 3C:
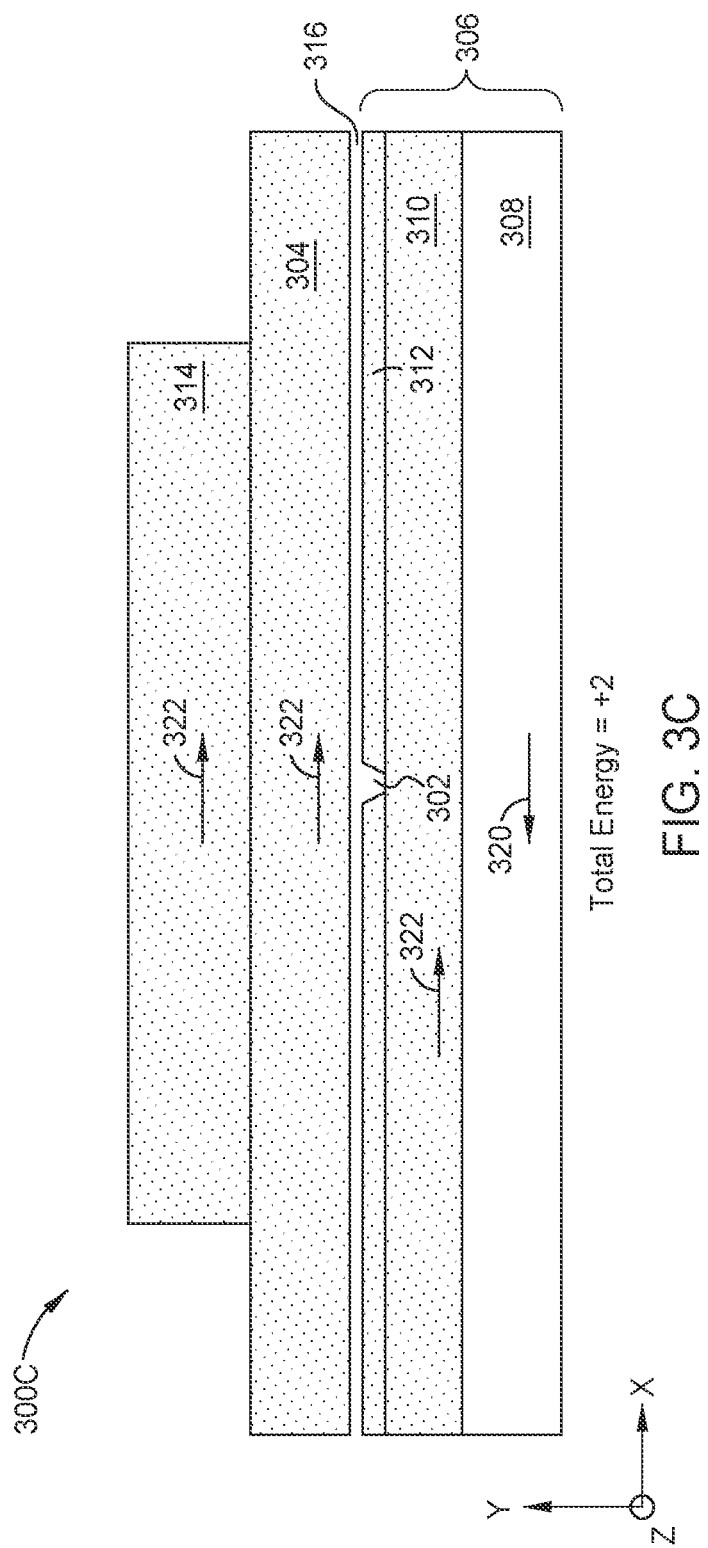

In the magnetic recording head 300C of FIG. 3C, the upper leading shield 310, the side shields 312, the trailing shield 304, and the upper return pole 314 have the first domain state 322 while the lower leading shield 308 has the second domain state 320. As a result, the overall magnetostatic energy of the magnetic recording head 300C is +2, which is relatively unstable. With small disturbances, this metastable state of +2 could have domain wall movement which causes performance issues, such as loss of overwrite.

Figure 3D:
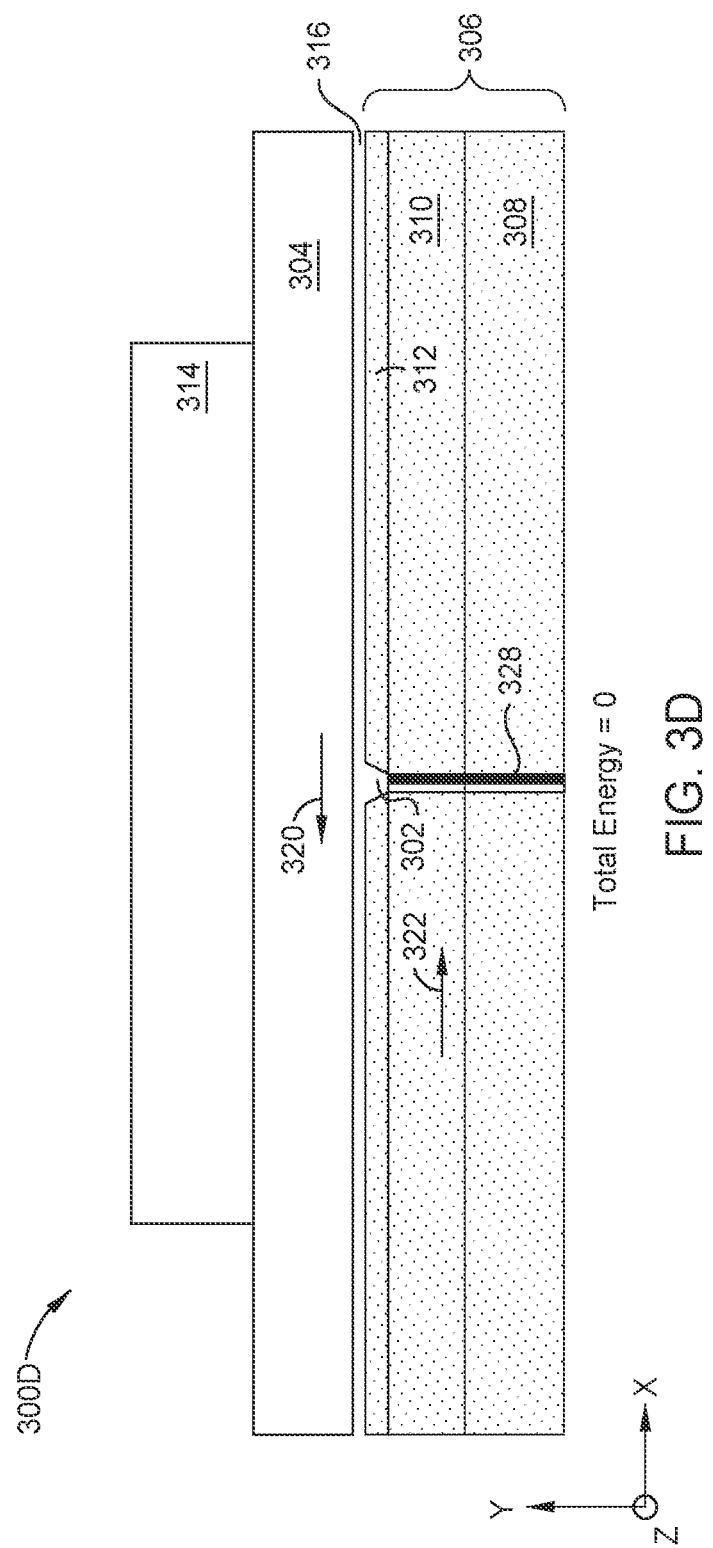

In the magnetic recording head 300D of FIG. 3D, the upper return pole 314 and the trailing shield 304 have the second domain state 320 while the lower leading shield 308 and the upper leading shield 310 have the first domain state 322. While the overall magnetostatic energy of the magnetic recording head 300D is 0, a vertical domain wall 328 occurs through the leading shield 306. The domain wall 328 is caused by magnetic flux flowing through the leading shield 306 in the z-direction and the −z-direction. The domain wall 328 occurs because the trailing shield 304 and the upper leading shield 310 have anti-parallel domain direction, thus causing the shield domain wall 328 across the main pole 302, resulting in performance loss and cross track interference.

Figure 3E:
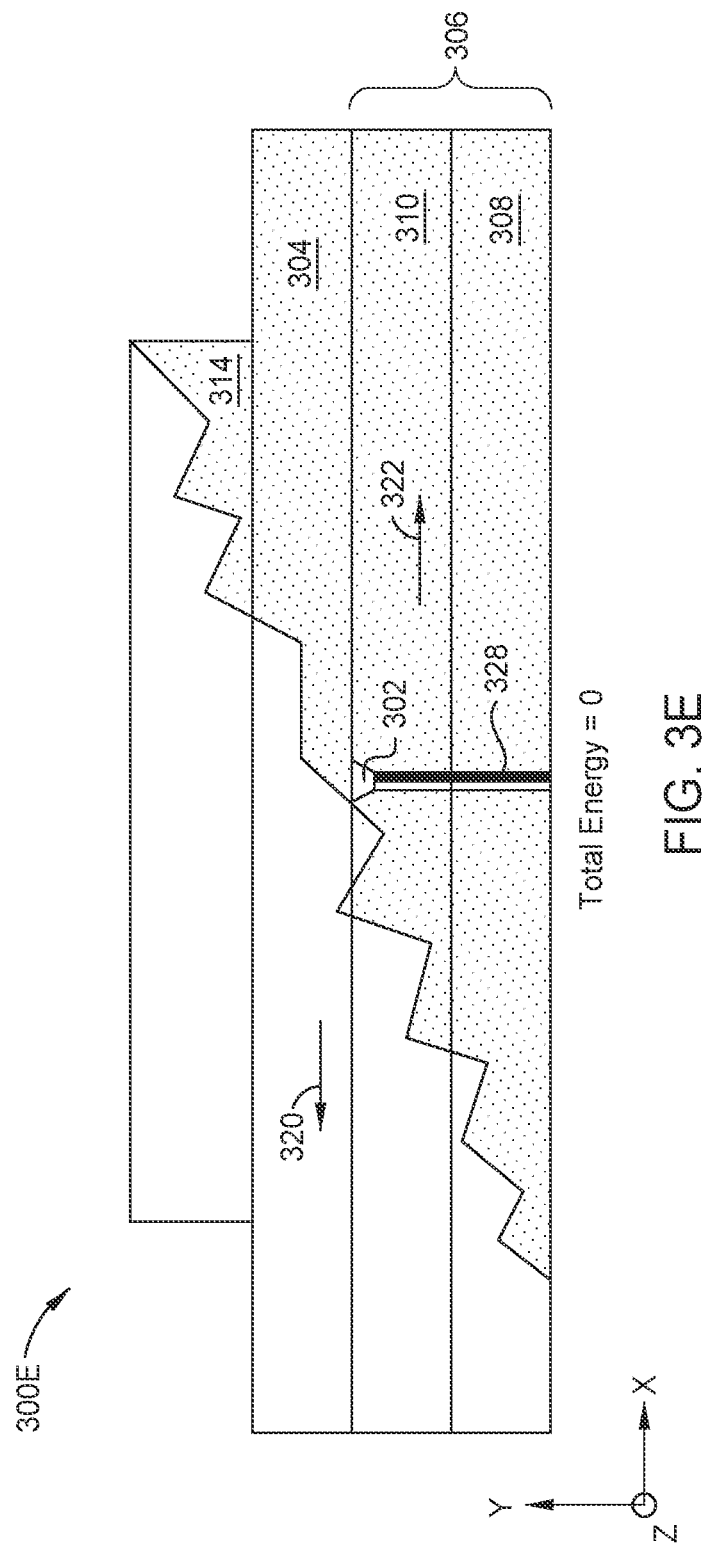

In the magnetic recording head 300E of FIG. 3E, the majority of the upper return pole 314, about half of the trailing shield 304, a portion of the upper leading shield, and a minority of the lower leading shield 308 have the second domain state 320 while the majority of lower leading shield, a portion of the upper leading shield 310, about half of the trailing shield 304, and a minority of the upper return pole 313 have the first domain state 322. While the overall magnetostatic energy of the magnetic recording head 300E is 0, a vertical domain wall 328 occurs through the leading shield 306. The domain wall 328 is caused by magnetic flux flowing through the leading shield 306 in the z-direction and the −z-direction. The domain wall 328 occurs because the trailing shield 304 and the upper leading shield 310 have anti-parallel domain direction, thus causing the shield domain wall 328 across the main pole 302, resulting in performance loss and cross track interference.

FIGS. 4A-4F illustrate MFS views of magnetic recording heads 400A-400F having stable domain states, according to various embodiments. Each of the magnetic recording heads 400A-400F may be the write head 200 of FIG. 2. The magnetic recording heads 400A-400F may be considered different embodiments of the same magnetic recording head. As such, aspects of the magnetic recording heads 400A-400F may be used in combination, such as with respect to the various thicknesses shown.

Each of the magnetic recording heads 400A-400F comprises a main pole 302, side shields 312 disposed adjacent to the main pole (e.g., the x-direction), a leading shield 306 disposed below the main pole 302 and side shields 312 (e.g., the −y-direction), a trailing shield 304 disposed above the main pole 302 and side shields 312 (e.g., the y-direction), and a upper return pole 314 disposed above the trailing shield 304. The leading shield 306 comprises a lower leading shield 308 and an upper leading shield 310. In some embodiments, the side shields 312 are considered part of the upper leading shield 310. In other words, the upper leading shield 310 may comprise the side shields 312, and as such, the leading shield 306 may comprise the side shields 312.

A first non-magnetic layer 416 is disposed between the side shields 312 and the trailing shield 304, a second non-magnetic layer 424 is disposed between the lower leading shield 308 and the upper leading shield 310, and a third non-magnetic layer 426 is disposed above the main pole 302 between the side shields 312 and trailing shield 304. The first non-magnetic layer 416 comprises a non-magnetic insulating material. In some embodiments, to achieve magnetostatic coupling, the second and third non-magnetic layers 424, 426 may each individually comprises Ta, W, NiCr, NiFeCr, Ti, Au, or Cu, and have a thickness between about 5 Å to about 20 Å. In another embodiment, to achieve magnetostatic coupling, any nonmagnetic metal, excluding dielectric materials, may be used for each of the second and third non-magnetic layers 424, 426. In yet another embodiment, to achieve anti-ferromagnetic coupling, each of the second and third non-magnetic layers 424, 426 may individually comprises Ru, Cr, Rh, or Ir, and have a thickness between about 4 Å to about 5 Å or between about 7 Å to about 8 Å. Thus, the material and thickness of the second and third non-magnetic layers 424, 426 is dependent upon the type of coupling desired.

The main pole 302 and/or the upper return pole 314 may comprise ferromagnetic materials, typically alloys of one or more of Co, Fe, and Ni. The trailing shield 304 may be a magnetic material such as NiFe alloy or NiFeX, where X is Re, Ho, Zr, Hf, or the like. In one embodiment, the trailing shield 304 has an Ms of about 1.2 T to about 1.6 T. One or more of the side shields 312 and the leading shield 306 are made of NiFe alloys, NiFeX, where X is Re, Ho, Zr, Hf, or the like, or other compositions having high magnetic permeability (e.g., magnetically soft), such as CoFe, CoFeNi, CoTaZr, CoFeTaZr, combinations thereof, or alloys thereof. The upper leading shield 310 and the lower leading shield 308 may comprise the same material or different materials.

Similar to the magnetic recording heads 300A-300E of FIGS. 3A-3E, each of the magnetic recording heads 400A-400F has two anti-parallel domain states, a first magnetic domain state 322 in the x-direction, represented by the shading, (e.g., a positive domain state) and a second magnetic domain state 320 in the −x-direction, represented by without any shading, (e.g., a negative domain state). The domain states of the magnetic recording heads 400A-400D result from a combination of the materials used in the magnetic recording heads 400A-400F, the stress of the materials, various geometries of the magnetic recording heads 400A-400F, exchange coupling, and favorable energy states, for example. The lower leading shield 308, the upper leading shield 310, the trailing shield 304, and the upper return pole 314 each has about the same area at the MFS, and thus, is assigned a unit of "1" with respect to the magnetic domain states of each shield. For example, when a magnetic field is applied in entirety to each of the magnetic recording heads 400A-400F in the +x-direction, each of the magnetic recording heads 400A-400F is in the magnetostatic energy state of +4. Similarly, when a magnetic field is applied in entirety to each of the magnetic recording heads 400A-400F in the −x-direction, each of the magnetic recording heads 400A-400F is in the magnetostatic energy state of −4.

Initially, during the backend process prior to operation of the magnetic recording heads 400A-400F, a magnetic field is applied to each magnetic recording head 400A-400F to force the domain state to all be the same or in the same direction (e.g., the first domain state 322). Once the magnetic field is removed, the domain states of the magnetic recording heads 400A-400F relax to the most natural domain states or the lowest overall magnetic energy. It is undesirable to have the upper leading shield 310 and the trailing shield 304 to be in antiparallel magnetic state, as such an antiparallel magnetic state will induce performance loss and cross track interference. The domain states or magnetostatic energy of the magnetic recording heads 400A-400F are stable, resulting in the various shields of the magnetic recording heads 400A-400F, such as the trailing shield 304, the side shields 312, and/or the leading shield 306, being stabilized.

As noted above, the material and thickness of the second and third non-magnetic layers 424, 426 is dependent upon the type of coupling desired. The second and third non-magnetic layers 424, 426 comprising Ta, W, NiCr, NiFeCr, Ti, Au, or Cu cause magnetostatic coupling, depending on the thicknesses of the second and third magnetic layers 424, 426, to occur between the lower leading shield 308 and the upper leading shield 310, between the side shields 312 and the trailing shield 304, and between the trailing shield 304 and the upper return pole 314. The materials of the shield 304, 308, 310, and 312, such as NiFe, has strong ferromagnetic coupling between grains of NiFe. When a nonmagnetic metal is inserted between the various shields, such as the second and third non-magnetic layers 424, 426, the ferromagnetic coupling is broken at the interface. The two pieces of various shields (i.e., the lower leading shield 308 and the upper leading shield 310, and the trailing shield 304 and the upper return pole 314) naturally like to form antiparallel domain states to minimize energy when a non-magnetic layer comprising NiCr, NiFeCr, Ti, Au, or Cu is disposed between the shields, which is called magnetostatic coupling.

The second and third non-magnetic layers 424, 426 comprising Ru, Cr, Rh, or Ir cause RKKY coupling and anti-ferromagnetic (AFC) coupling, depending on the thicknesses of the second and third magnetic layers 424, 426, to occur between the lower leading shield 308 and the upper leading shield 310, between the side shields 312 and the trailing shield 304, and between the trailing shield 304 and the upper return pole 314. When a layer of Ru, Cr, Rh, or Ir is inserted between the various shields, RKKY coupling, which is a type of exchange coupling between two ferromagnetic layers, is created. Depending on the thickness of the Ru, Cr, Rh, or Ir layers, the coupling could be anti-ferromagnetic or ferromagnetic. For anti-ferromagnetic coupling, at a thin thickness of about 4 Å to about 5 Å (i.e., a first peak of AFC coupling), the coupling strength is much stronger than at a thicker thickness of about 7 Å to about 8

Å (i.e., a second peak of AFC coupling). In between about 5 Å to about 7 Å, there is a thickness at which the coupling is ferromagnetic in nature. The AFC coupling of RKKY origin between the various shields breaks the exchange coupling between the shields. As such, the lower leading shield 308 and the upper leading shield 310 are anti-parallel coupled and the trailing shield 304 and the upper return pole 314 are anti-parallel coupled, resulting in each of the magnetic recording heads 400A-400F to have stable domain states.

Moreover, each of the second and third non-magnetic layers 424, 426 may comprise a different material. As such, in some embodiments, the upper return pole 314 and the trailing shield 304 may be AFC coupled while the upper leading shield 310 and the lower leading shield 308 may be magnetostatically coupled, or vice versa. In other embodiments, one or more of the second and third non-magnetic layers 424, 426 may comprise the same material. Thus, the upper return pole 314 and the trailing shield 304 may be AFC coupled and the upper leading shield 310 and the lower leading shield 308 may be magnetostatically coupled, or the upper return pole 314 and the trailing shield 304 may be magnetostatically coupled and the upper leading shield 310 and the lower leading shield 308 may be AFC coupled.

In the magnetic recording head 400A of FIG. 4A, the trailing shield 304, the side shields 312, and the upper leading shield 310 have the first domain state 322 while the lower leading shield 308 and the upper return pole 314 have the second domain state 320. Thus, the overall total magnetostatic energy of the magnetic recording head 400A is 0 when each of the lower leading shield 308, the upper leading shield 310, the trailing shield 304, and the upper return pole 314 has a same thickness 430 in the y-direction.

Figure 4B:
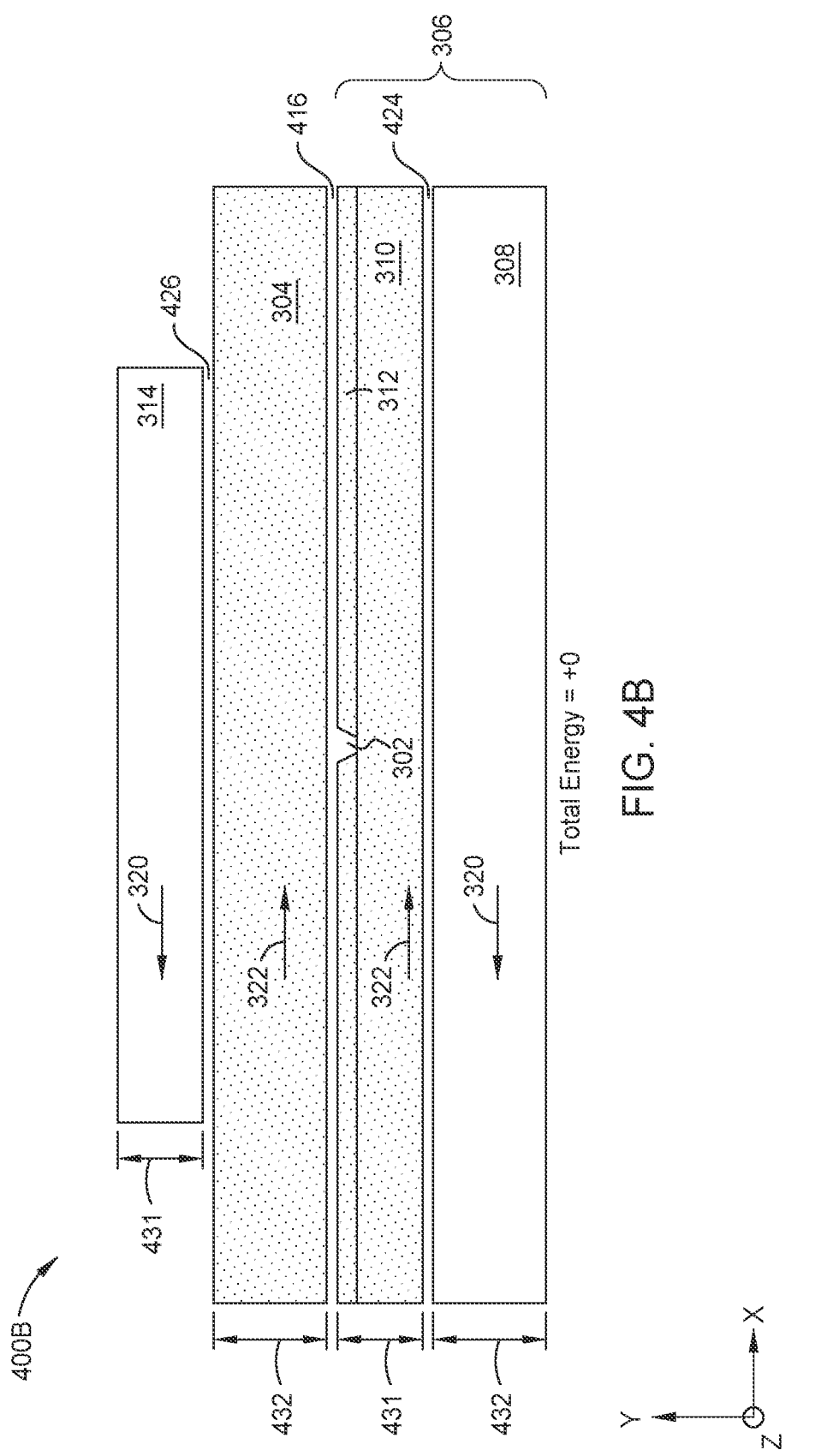

In the magnetic recording head 400B of FIG. 4B, the upper return pole 314 and the upper leading shield 310 each has a same first thickness 431 in the y-direction about 10% to about 30% less than a same second thickness 432 in the y-direction of each of the lower leading shield 308 and the trailing shield 304, resulting in the magnetic recording head 400B having an overall total magnetostatic energy of 0. As such, even in embodiments where the upper return pole 314 and the upper leading shield 310 are about 10% to about 30% thinner than the lower leading shield 308 and the trailing shield 304, the proportions of the first domain state 322 to the second domain state 320 of the magnetic recording head 400B remain about equal.

Similarly, in the magnetic recording head 400C of FIG. 4C, the trailing shield 304, the side shields 312, and the upper leading shield 310 have the second domain state 320 while the lower leading shield 308 and the upper return pole 314 have the first domain state 322. Thus, the overall total magnetostatic energy of the magnetic recording head 400C is 0 when each of the lower leading shield 308, the upper leading shield 310, the trailing shield 304, and the upper return pole 314 has a same thickness 430 in the y-direction.

Figure 4D:
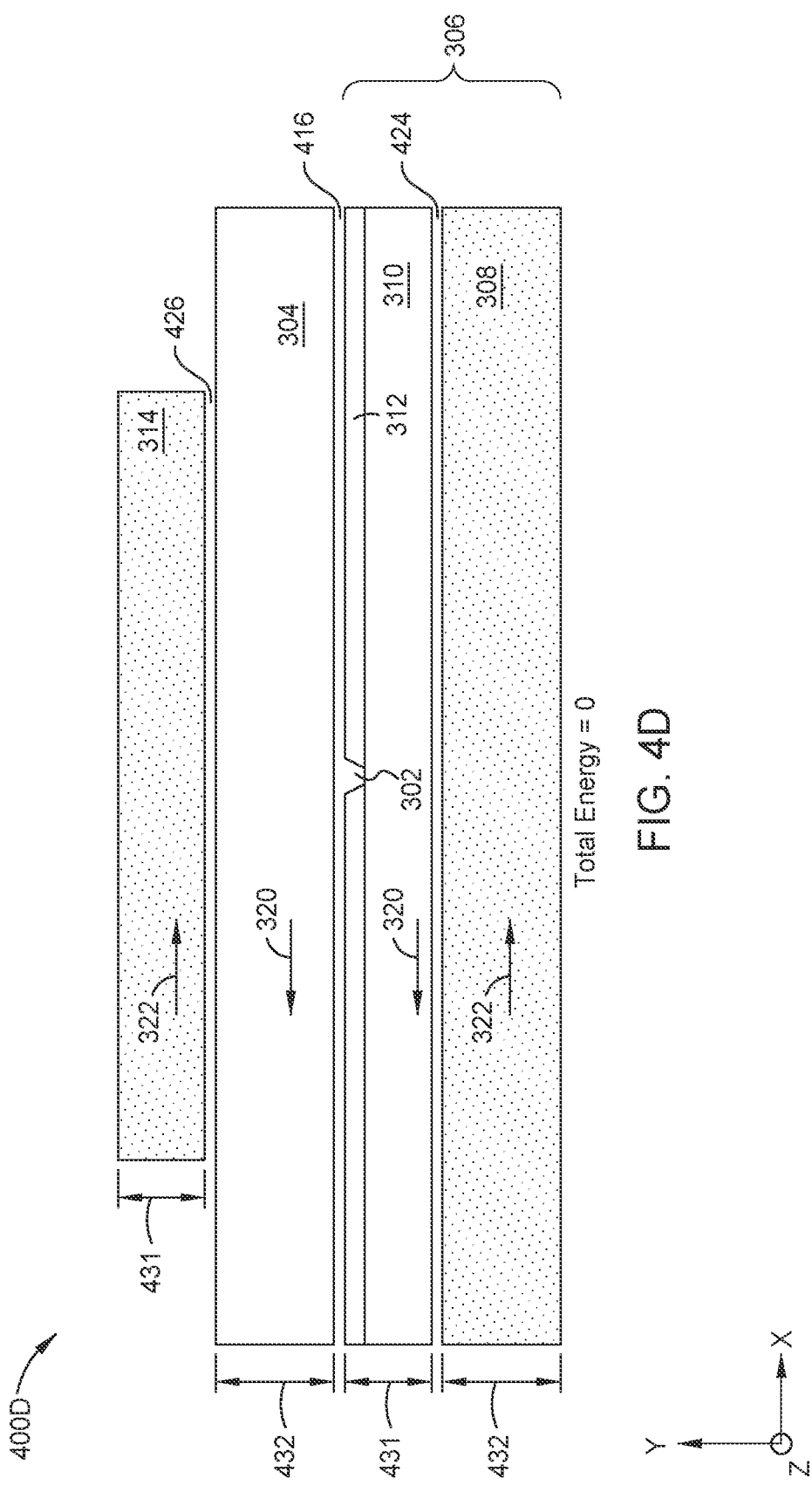

In the magnetic recording head 400D of FIG. 4D, the upper return pole 314 and the upper leading shield 310 each has a same first thickness 431 in the y-direction about 10% to about 30% less than a same second thickness 432 in the y-direction of each of the lower leading shield 308 and the trailing shield 304, resulting in the magnetic recording head 400D having an overall total magnetostatic energy of 0. As such, even in embodiments where the upper return pole 314 and the upper leading shield 310 including the side shields 312 are about 10% to about 30% thinner than the lower leading shield 308 and the trailing shield 304, the proportions of the first domain state 322 to the second domain state 320 of the magnetic recording head 400D remain about equal.

The magnetic recording heads 400A-400D of FIGS. 4A-4D have the most favorable energetic states due to the trailing shield 304 and the upper leading shield 310 having the same domain state, as well as due to the lower leading shield 308 and the upper leading shield 310 having different domain states. Because the trailing shield 304 and the upper leading shield 310 having the same domain state, and the lower leading shield 308 and the upper leading shield 310 having different domain states, AFC coupling of RKKY origin occurs between the trailing shield 304 and the upper return pole 314, and between the lower leading shield and the upper leading shield 310, which breaks the exchange coupling between the trailing shield 304 and the upper return pole 314, and between the lower leading shield and the upper leading shield 310. As such, the lower leading shield 308 and the upper leading shield 310 are anti-parallel coupled and the trailing shield 304 and the upper return pole 314 are anti-parallel coupled, resulting in the magnetic recording heads 400A-400D having stable magnetostatic energy states.

Figure 4E:
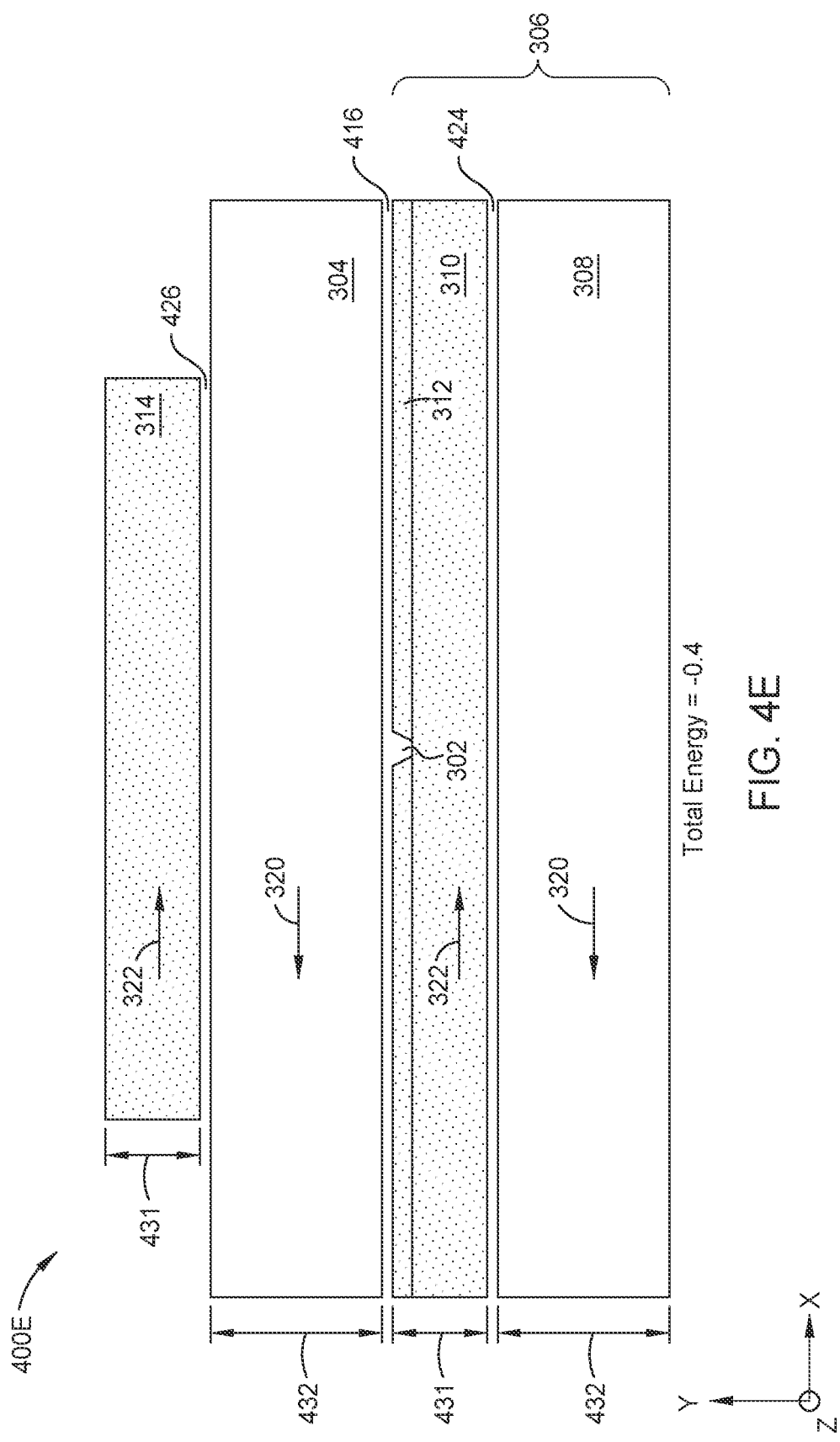

In the magnetic recording head 400E of FIG. 4E, the side shields 312, the upper leading shield 310, and the upper return pole 314 have the first domain state 322 while the lower leading shield 308 and the trailing shield 304 have the second domain state 320. The upper return pole 314 and the upper leading shield 310 each has a same first thickness 431 in the y-direction about 10% to about 30% less than a same second thickness 432 in the y-direction of each of the lower leading shield 308 and the trailing shield 304. Thus, the overall total energy of the magnetic recording head 400E is −0.4 when the first thickness 431 is about 10% less than the second thickness 432. However, the magnetic recording head 400E is not a preferred embodiment due to the trailing shield 304 and the upper leading 310 having different domain states, which results in the magnetic recording head 400E being less magnetostatically stable and less energetically stable.

Figure 4F:
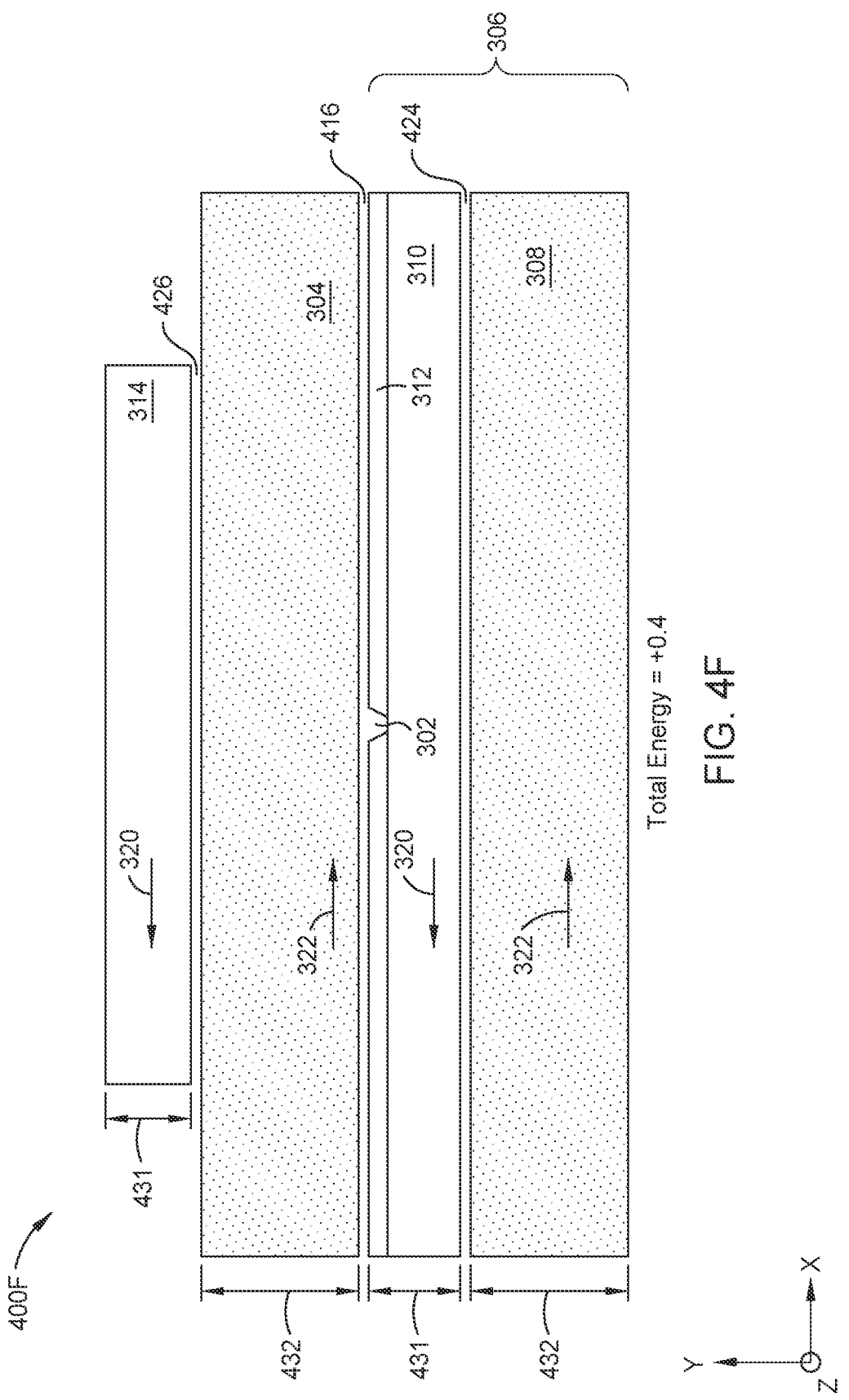

The magnetic recording head 400F of FIG. 4F is similar to the magnetic recording head 400E but the domain states are reversed. In the magnetic recording head 400F of FIG. 4F, the side shields 312, the upper leading shield 310, and the upper return pole 314 have the second domain state 320 while the lower leading shield 308 and the trailing shield 304 have the first domain state 322. The upper return pole 314 and the upper leading shield 310 each has a same first thickness 431 in the y-direction about 10% to about 30% less than a same second thickness 432 in the y-direction of each of the lower leading shield 308 and the trailing shield 304. Thus, the overall total energy of the magnetic recording head 400F is about +0.4 when the first thickness 431 is about 10% less than the second thickness 432. In one embodiment, each of the lower leading shield 308, the upper leading shield 310, the trailing shield 304, and the upper return pole 314 has a same thickness in the y-direction (e.g., where a first thickness 431 equals a second thickness 433). However, the magnetic recording head 400F is not a preferred embodiment due to the trailing shield 304 and the upper leading 310 having different domain states, which results in the magnetic recording head 400F being less magnetostatically stable and less energetically stable.

While the magnetic recording heads 400E-400F are stable, the magnetostatic energy state is less favorable and more likely to fail than the magnetic recording heads 400A-400D due to the trailing shield 304 and the upper leading shield 310 having different domain states. By increasing the thickness of the lower leading shield 308 and the trailing shield 304 to be greater than the thickness of the upper leading shield 310 and the upper return pole 314, the magnetostatic energy states shown in the magnetic recording heads 400E-400F are less likely to occur, increasing the probability that the domain states of the shields 308, 310, 304, 314 will favor the domain states shown in FIGS. 4A-4D.

As shown in each magnetic recording head 400A-400D of FIGS. 4A-4D, the upper return pole 314 and the trailing shield 304 always have a different domain state 320, 322, and the lower leading shield 308 and the upper leading shield 310 always have a different domain state 320, 322. The upper return pole 314 and the trailing shield 304, and the lower leading shield 308 and the upper leading shield 310, having different domain states 320, 322, together with the second and third non-magnetic layers 424, 426, enables either RKKY coupling or magnetostatic coupling between the upper return pole 314 and the trailing shield 304, and either RKKY coupling or magnetostatic coupling between the lower leading shield 308 and the upper leading shield 310, to break the exchange coupling between the upper return pole 314 and the trailing shield 304, and to break the exchange coupling between the lower leading shield 308 and the upper leading shield 310.

Tables 1 and 2 below are exemplary summaries of various magnetostatic energies within a magnetic recording head, such as a magnetic recording head 400A-400F of FIGS. 4A-4F. Table 1 below illustrates one embodiment of magnetostatic energies and stability of magnetic recording heads where the trailing shield 304 has a greater thickness than the upper return pole 314, and where the lower leading shield 308 has a greater thickness than the upper leading shield 310.

TABLE 1

|  | Thickness ratio | 1 | 2 | 3 | 4 | 5 | 6 |
|---|---|---|---|---|---|---|---|
|  |  |  |  | Domain state |  |  |  |
| Upper return pole | 0.9 | Negative | Negative | Positive | Negative | Positive | Positive |
| Trailing shield | 1.1 | Positive | Positive | Positive | Negative | Negative | Negative |
| Upper leading shield | 0.9 | Positive | Negative | Negative | Positive | Negative | Positive |
| Lower leading shield | 1.1 | Negative | Positive | Negative | Positive | Negative | Positive |
| Total magnetostatic energy |  | 0 | +0.4 | 0 | 0 | −0.4 | 0 |
| Stability |  | Stable | Less stable | Stable | Stable | Less stable | Stable |

In Table 1, the first embodiment of column 1 is the preferred embodiment shown in FIG. 4B, where the upper return pole 314 and the trailing shield 304 have different domain states, the upper leading shield 310 and the lower leading shield have different domain states, and the trailing shield 304 and the upper leading shield 310 have a same domain state. As such, the first embodiment of column 1 is magnetically stable. The sixth embodiment of column 6 shown in FIG. 4D is less preferred than the first embodiment, but is still magnetically stable. The second embodiment of column 2 shown in FIG. 4F and the fifth embodiment of column 5 shown in FIG. 4E are not preferred, as the trailing shield 304 and the upper leading shield 310 have different domain states, which could cause a domain wall to form like discussed in FIGS. 3D-3E, resulting in performance degradation. The third embodiment of column 3 and the fourth embodiment of column 4 do not exist because anti-parallel coupling between the upper return pole 314 and the trailing shield 304, and between the upper leading shield 310 and the lower leading shield 308, does not occur.

Table 2 below illustrates another embodiment of magnetostatic energies and stability of magnetic recording heads where the trailing shield 304 has a greater thickness than the upper return pole 314, and where the upper leading shield 310 has a greater thickness than the lower leading shield 308.

TABLE 2

|  | Thickness ratio | 1 | 2 | 3 | 4 | 5 | 6 |
|---|---|---|---|---|---|---|---|
|  |  |  |  | Domain state |  |  |  |
| Upper return pole | 0.9 | Negative | Negative | Positive | Negative | Positive | Positive |
| Trailing shield | 1.1 | Positive | Positive | Positive | Negative | Negative | Negative |

TABLE 2-continued

| | Thickness ratio | 1 | 2 | 3 | 4 | 5 | 6 |
|---|---|---|---|---|---|---|---|
| | | | | Domain state | | | |
| Upper leading shield | 1.1 | Positive | Negative | Negative | Positive | Negative | Positive |
| Lower leading shield | 0.9 | Negative | Positive | Negative | Positive | Negative | Positive |
| Total magnetostatic energy | | +0.4 | 0 | 0 | 0 | 0 | −0.4 |
| Stability | | Stable | Less stable | Stable | Stable | Less stable | Stable |

In Table 2, the first embodiment of column 1 is a preferred embodiment shown in FIG. 4B, where the upper return pole 314 and the trailing shield 304 have different domain states, the upper leading shield 310 and the lower leading shield have different domain states, and the trailing shield 304 and the upper leading shield 310 have a same domain state. While the first embodiment of column 1 of Table 2 is magnetically stable, it is less stable than the first embodiment of column 1 of Table 1 due to the total magnetostatic energy being +0.4.

In Table 2, the sixth embodiment of column 6 shown in FIG. 4D is less preferred than the first embodiment of Tables 1 and 2, but is still magnetically stable. However, the sixth embodiment of column 6 of Table 2 is less stable than the sixth embodiment of column 6 of Table 1 due to the total magnetostatic energy being −0.4. The second embodiment of column 2 shown in FIG. 4F and the fifth embodiment of column 5 shown in FIG. 4E are not preferred, as the trailing shield 304 and the upper leading shield 310 have different domain states, which could cause a domain wall to form like discussed in FIGS. 3D-3E, resulting in performance degradation. The third embodiment of column 3 and the fourth embodiment of column 4 do not exist because anti-parallel coupling between the upper return pole 314 and the trailing shield 304, and between the upper leading shield 310 and the lower leading shield 308, does not occur.

Figure 5A:
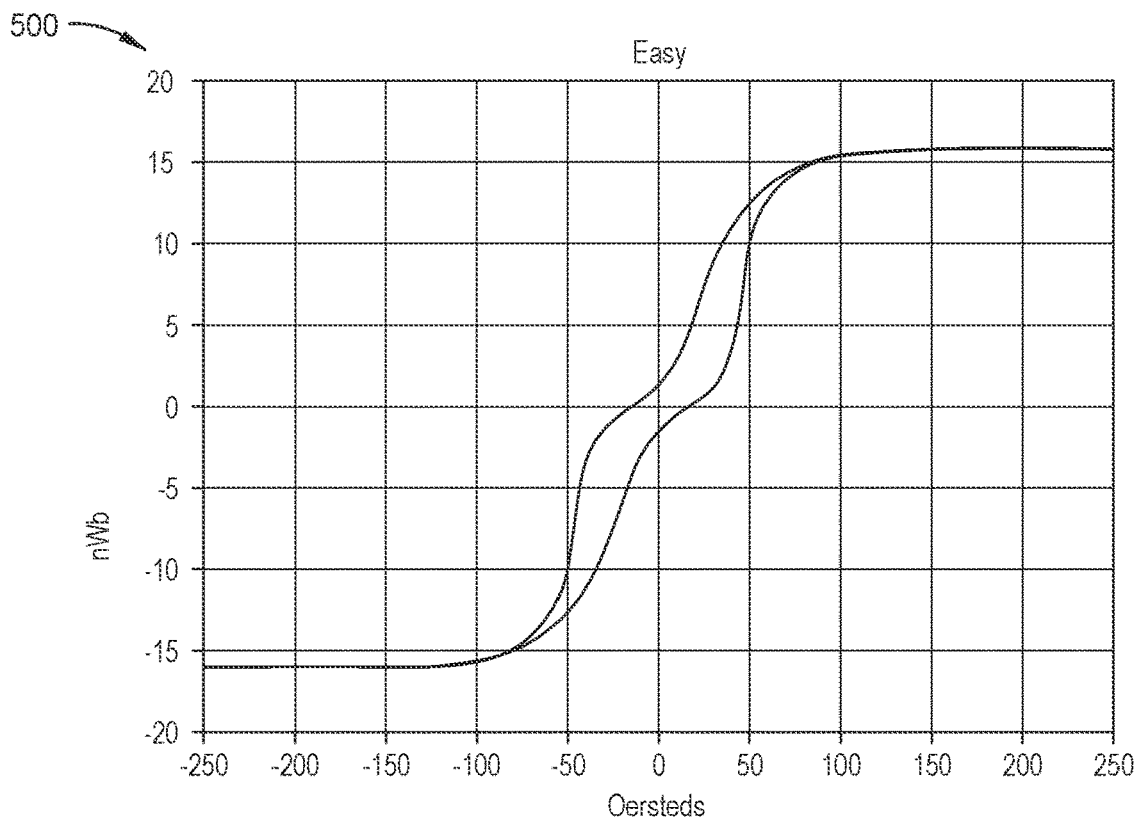
FIGS. 5A-5B are graphs illustrating the RKKY and AFC coupling between a lower leading shield and a upper leading shield of any of the magnetic recording heads of FIGS. 4A-4F, according to various embodiments.
Figure 5B:
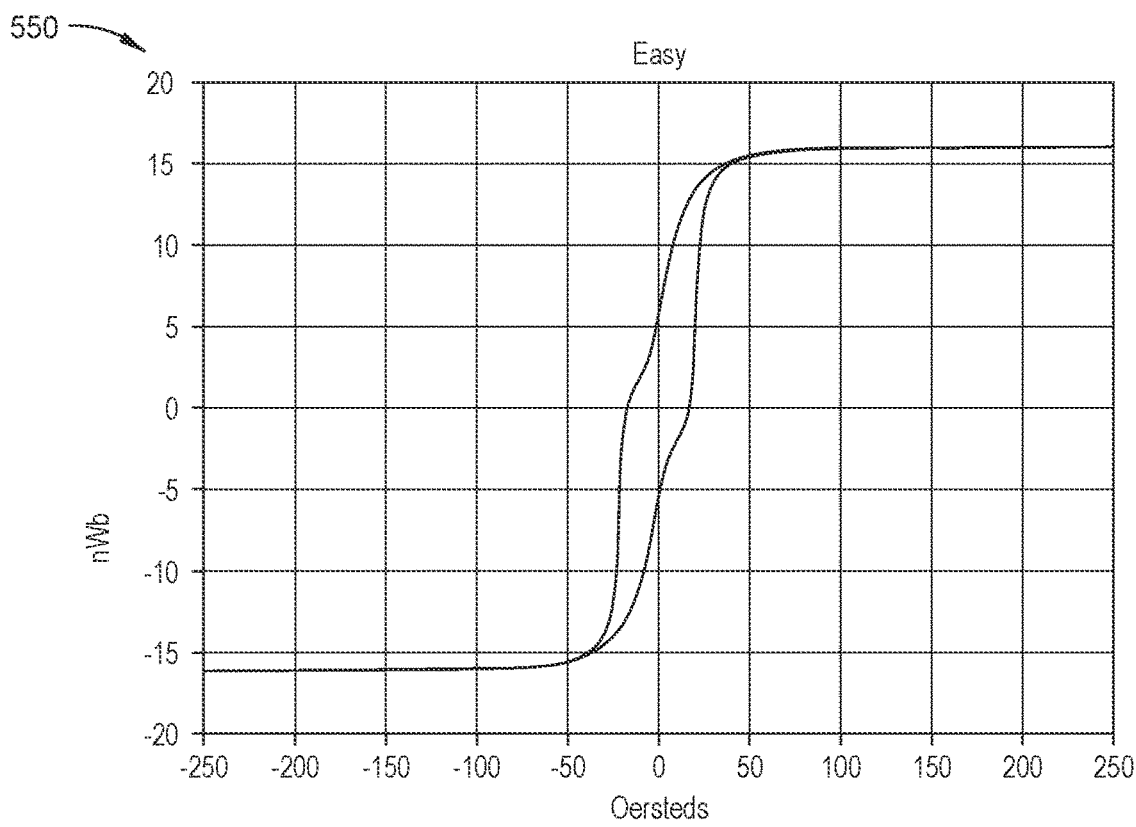

FIGS. 5A-5B are graphs 500, 550, respectively, of hysteresis loops illustrating the RKKY and AFC coupling strength between the lower leading shield 308 and the upper leading shield 310 of any of the magnetic recording heads 400A-400F of FIGS. 4A-4F due to the second non-magnetic layer 424, according to various embodiments. The graph 500 of FIG. 5A shows stronger AFC coupling for a lower leading shield 308 comprising NiFe55 at a thickness of about 25 nm to about 35 nm, the second non-magnetic layer 424 comprising Ru at a thickness of about 7.2 Å, and an upper leading shield 310 comprising NiFe55 at a thickness of about 25 nm to about 35 nm. The graph 550 of FIG. 5B shows weaker AFC coupling for a lower leading shield 308 comprising NiFe55 at a thickness of about 25 nm to about 35 nm, the second non-magnetic layer 424 comprising Ru at a thickness of about 8.2 Å, and an upper leading shield 310 comprising NiFe55 at a thickness of about 25 nm to about 35 nm. As shown in the graphs 500, 550, the thickness of the second non-magnetic layer 424 affects the RKKY coupling strength and AFC coupling strength between the various layers. Thus, the coupling strength between the upper leading shield 310 and the lower leading shield 308 can be adjusted as necessary.

Therefore, in magnetic recording heads where the upper return pole and the trailing shield always have a different domain state, and where the lower leading shield and the upper leading shield always have a different domain state, the magnetic read heads have stable domain states or magnetostatic energy. The upper return pole and the trailing shield, and the lower leading shield and the upper leading shield, having different domain states, together with the non-magnetic layers disposed between the shields, enables either RKKY coupling or magnetostatic coupling between the upper return pole and the trailing shield, and either RKKY coupling or magnetostatic coupling between the lower leading shield and the upper leading shield, to break the exchange coupling between the upper return pole and the trailing shield, and between the lower leading shield and the upper leading shield. As a result, the lower leading shield and the upper leading shield are anti-parallel coupled, and the trailing shield and the upper return pole are anti-parallel coupled. Thus, the overall total energy of the magnetic recording head is 0 or stable.

In one embodiment, a magnetic recording head comprises a main pole, a trailing shield disposed above the main pole, an upper return pole disposed above the trailing shield, the upper return pole having a different domain state than the trailing shield, wherein the trailing shield and the upper return pole are anti-parallel coupled, a first non-magnetic layer disposed between the upper return pole and the trailing shield, an upper leading shield disposed below the main pole, a lower leading shield disposed below the upper leading shield, the lower leading shield having a different domain state than the upper leading shield, wherein the upper leading shield and the lower leading shield are anti-parallel coupled, and a second non-magnetic layer disposed between the upper leading shield and the lower leading shield.

The first non-magnetic layer and the second non-magnetic layer each individually comprises Ru, Cr, Rh, or Ir. The first non-magnetic layer and the second non-magnetic layer have a same thickness. The trailing shield, the upper return pole, the upper leading shield, and the lower leading shield each has a same thickness. The trailing shield and the upper leading shield has a same domain state. The trailing shield and the lower leading shield each has a first thickness about 10% to about 30% greater than a second thickness of the upper return pole and the upper leading shield. The upper return pole and the trailing shield are RKKY coupled, and the upper leading shield and the lower leading shield are RKKY coupled. A total magnetostatic energy of the magnetic recording head is about 0. A magnetic recording device comprising the magnetic recording head.

In another embodiment, a magnetic recording head comprises a main pole, a trailing shield disposed on the main pole, the trailing shield having a first domain state, an upper return pole disposed on the trailing shield, the upper return pole having a second domain state, the first and second domain states being anti-parallel, a first non-magnetic layer disposed between and in contact with the upper return pole and the trailing shield, an upper leading shield disposed below the main pole, the upper leading shield having the first domain state, wherein the upper return pole and the trailing shield are magnetostatically coupled, a lower leading shield disposed below the upper leading shield, the lower leading shield having the second domain state, and a second non-magnetic layer disposed between and in contact with the upper leading shield and the lower leading shield, wherein the upper leading shield and the lower leading shield are anti-ferromagnetically coupled.

The trailing shield and the lower leading shield each has a first thickness about 10% to about 30% greater than a second thickness of the upper return pole and the upper leading shield. The first non-magnetic layer comprises NiCr, NiFeCr, Ti, Au, or Cu. The second non-magnetic layer comprises Ru, Cr, Rh, or Ir. The upper leading shield comprises side shields disposed adjacent to the main pole. A third non-magnetic layer is disposed above the main pole between the side shields and the trailing shield. A total magnetostatic energy of the magnetic recording head is about 0. The upper leading shield and the lower leading shield are anti-parallel coupled. The second non-magnetic layer has a thickness between about 4 Å to about 5 Å or between about 7 Å to about 8 Å. A magnetic recording device comprising the magnetic recording head.

In yet another embodiment, a magnetic recording head comprises a main pole, a trailing shield disposed above the main pole, the trailing shield having a first domain state and a first thickness, an upper return pole disposed above the trailing shield, the upper return pole having a second domain state and a second thickness less than the first thickness, wherein the upper return pole and the trailing shield are anti-ferromagnetically coupled, a first non-magnetic layer disposed between the upper return pole and the trailing shield, the first non-magnetic layer comprising Ru, Cr, Rh, or Ir, an upper leading shield disposed below the main pole, the upper leading shield having the first domain state and the second thickness, wherein the upper leading shield comprises side shields disposed adjacent to the main pole, a lower leading shield disposed below the upper leading shield, the lower leading shield having the second domain state and the first thickness, and a second non-magnetic layer disposed between the upper leading shield and the lower leading shield, the second non-magnetic layer comprising NiCr, NiFeCr, Ti, Au, or Cu, wherein a total magnetostatic energy of the magnetic recording head is about 0, and wherein the upper leading shield and the lower leading shield are magnetostatically coupled.

The first domain state is positive and the second domain state is negative. The first domain state is negative and the second domain state is positive. The first non-magnetic layer has a thickness between about 4 Å to about 5 Å or between about 7 Å to about 8 Å. The first thickness is about 10% to about 30% greater than the second thickness. The second non-magnetic layer has a thickness between about 4 Å to about 9 Å. A magnetic recording device comprising the magnetic recording head.

While the foregoing is directed to embodiments of the present disclosure, other and further embodiments of the disclosure may be devised without departing from the basic scope thereof, and the scope thereof is determined by the claims that follow.

What is claimed is:

1. A magnetic recording head, comprising:
   a main pole;
   a trailing shield disposed above the main pole;
   an upper return pole disposed above the trailing shield, the upper return pole having a different domain state than the trailing shield, wherein the trailing shield and the upper return pole are anti-parallel coupled;
   a first non-magnetic layer disposed between the upper return pole and the trailing shield;
   an upper leading shield disposed below the main pole;
   a lower leading shield disposed below the upper leading shield, the lower leading shield having a different domain state than the upper leading shield, wherein the upper leading shield and the lower leading shield are anti-parallel coupled; and
   a second non-magnetic layer disposed between the upper leading shield and the lower leading shield.

2. The magnetic recording head of claim 1, wherein the first non-magnetic layer and the second non-magnetic layer each individually comprises Ru, Cr, Rh, or Ir, and wherein the first non-magnetic layer and the second non-magnetic layer have a same thickness.

3. The magnetic recording head of claim 1, wherein the trailing shield, the upper return pole, the upper leading shield, and the lower leading shield each has a same thickness.

4. The magnetic recording head of claim 1, wherein the trailing shield and the upper leading shield have a same domain state, and wherein the trailing shield and the lower leading shield each has a first thickness about 10% to about 30% greater than a second thickness of the return pole and the upper leading shield.

5. The magnetic recording head of claim 1, wherein the upper return pole and the trailing shield are RKKY coupled, and the upper leading shield and the lower leading shield are RKKY coupled.

6. The magnetic recording head of claim 1, wherein a total magnetostatic energy of the magnetic recording head is about 0.

7. A magnetic recording device comprising the magnetic recording head of claim 1.

8. A magnetic recording head, comprising:
   a main pole;
   a trailing shield disposed on the main pole, the trailing shield having a first domain state;
   an upper return pole disposed on the trailing shield, the upper return pole having a second domain state, the first and second domain states being anti-parallel;
   a first non-magnetic layer disposed between and in contact with the upper return pole and the trailing shield, wherein the upper return pole and the trailing shield are magnetostatically coupled;
   an upper leading shield disposed below the main pole, the upper leading shield having the first domain state;
   a lower leading shield disposed below the upper leading shield, the lower leading shield having the second domain state; and
   a second non-magnetic layer disposed between and in contact with the upper leading shield and the lower leading shield, wherein the upper leading shield and the lower leading shield are anti-ferromagnetically coupled.

9. The magnetic recording head of claim 8, wherein the trailing shield and the lower leading shield each has a first thickness about 10% to about 30% greater than a second thickness of the upper return pole and the upper leading shield.

10. The magnetic recording head of claim 8, wherein the first non-magnetic layer comprises NiCr, NiFeCr, Ti, Au, or Cu, and wherein the second non-magnetic layer comprises Ru, Cr, Rh, or Ir.

11. The magnetic recording head of claim 10, wherein the upper leading shield comprises side shields disposed adjacent to the main pole, and wherein a third non-magnetic layer is disposed above the main pole between the side shields and the trailing shield.

12. The magnetic recording head of claim 8, wherein a total magnetostatic energy of the magnetic recording head is about 0.

13. The magnetic recording head of claim 8, wherein the upper leading shield and the lower leading shield are antiparallel coupled, and wherein the second non-magnetic layer has a thickness between about 4 Å to about 5 Å or between about 7 Å to about 8 Å.

14. A magnetic recording device comprising the magnetic recording head of claim 8.

15. A magnetic recording head, comprising:
a main pole;
a trailing shield disposed above the main pole, the trailing shield having a first domain state and a first thickness;
an upper return pole disposed above the trailing shield, the upper return pole having a second domain state and a second thickness less than the first thickness, wherein the upper return pole and the trailing shield are antiferromagnetically coupled;
a first non-magnetic layer disposed between the upper return pole and the trailing shield, the first non-magnetic layer comprising Ru, Cr, Rh, or Ir;
an upper leading shield disposed below the main pole, the upper leading shield having the first domain state and the second thickness, wherein the upper leading shield comprises side shields disposed adjacent to the main pole;
a lower leading shield disposed below the upper leading shield, the lower leading shield having the second domain state and the first thickness; and
a second non-magnetic layer disposed between the upper leading shield and the lower leading shield, the second non-magnetic layer comprising NiCr, NiFeCr, Ti, Au, or Cu, wherein a total magnetostatic energy of the magnetic recording head is about 0, and wherein the upper leading shield and the lower leading shield are magnetostatically coupled.

16. The magnetic recording head of claim 15, wherein the first domain state is positive and the second domain state is negative.

17. The magnetic recording head of claim 15, wherein the first domain state is negative and the second domain state is positive.

18. The magnetic recording head of claim 15, wherein the first non-magnetic layer has a thickness between about 4 Å to about 5 Å or between about 7 Å to about 8 Å.

19. The magnetic recording head of claim 15, wherein the first thickness about 10% to about 30% greater than the second thickness.

20. The magnetic recording head of claim 15, wherein the second non-magnetic layer has a thickness between about 4 Å to about 9 Å.

21. A magnetic recording device comprising the magnetic recording head of claim 15.

* * * * *